3,394,985
GRAFT POLYMERIZATION REACTION OF POLYAMIDE FILAMENTS AND ACRYLIC ACID PROMOTED BY HYDROGEN PEROXIDE - FORMALDEHYDE SULFOXYLATE SALT CATALYST COMBINATION
Helmut H. Froehlich, Wilmington, Del., assignor to E. I. du Pont de Nemours and Company, Wilmington, Del., a corporation of Delaware
No Drawing. Filed Sept. 2, 1965, Ser. No. 484,728
5 Claims. (Cl. 8—115.5)

ABSTRACT OF THE DISCLOSURE

A process for making an acid-grafted nylon filament by impregnating the filament with acrylic or methacrylic acid, grafting the acid to the filament by means of a polymerization catalyst of hydrogen peroxide and a water soluble formaldehyde sulfoxylate salt, and then scouring the grafted filament to remove excess acid provides a high-speed process which yields filaments having a high resistance to hole melting.

---

This invention relates to an improved process for modifying polyamide filaments to increase their heat resistance.

STATE OF THE ART

Nylon filaments to which have been grafted unsaturated acids are the invention of D. Tanner, as shown in U.S. Patent No. 3,099,631, the disclosure of which is specifically incorporated herein by reference. As further described therein, the acid-grafted polyamide filaments may be converted to the salt form, for example, by reaction with calcium acetate, to yield filaments having an unexpected resistance to hole melting.

The Tanner patent describes grafting processes for producing such a product. These include the use of ionizing radiation or heat with chemical initiators to trigger the grafting reaction. Although the disclosed processes are effective for producing this fiber, they require the use of expensive irradiation equipment on the one hand, or heating sources on the other. At commercial operating speeds, it would be desirable to avoid these requirements.

OBJECTS

It is therefore an object of the instant invention to provide a process for preparing the grafted filaments of the Tanner patent in a relatively high-speed continuous process without the use of irradiation or heating equipment. It is another object of the instant invention to provide a continuous process for making such grafted filaments at a high level of uniformity and with economy of grafting materials.

STATEMENT OF INVENTION

These and other objects are attained in an improved process for making an acid-grafted nylon filament containing recurring amide linkages as an integral part of the polymer chain by impregnation throughout with an acid selected from acrylic acid and methacrylic acid, grafting the acid to the filament by means of a polymerization catalyst system, and then scouring the grafted filament to remove ungrafted polymeric acid. The improvement in this process to which the present invention is directed involves the use of the combination of hydrogen peroxide and a water soluble formaldehyde sulfoxylate salt as the polymerization catalyst system.

In one of two major embodiments to which the invention is directed, the process comprises the steps of:

(a) Impregnating the filament throughout by treatment for a period of about 0.5 to about 10 minutes with a mixture of hydrogen peroxide and an acid selected from acrylic acid and methacrylic acid to provide at least about 1600 equivalents of the acid per million grams of polycarbonamide, the mixture containing from about 3 to about 6 mole percent of hydrogen peroxide based on the moles of the acid, (b) Contacting the acid-treated filament with an aqueous solution containing from about 3 to about 7% by weight of a water-soluble formaldehyde sulfoxylate salt to initiate the grafting reaction within about 1.5 to about 4 minutes, and (c) Thereafter removing ungrafted polymeric acid from the filament by an aqueous scour.

In a second embodiment of the invention the process comprises the steps of:

(a) Impregnating and grafting the filament throughout by treatment with an aqueous mixture containing—

(1) about 40 to about 70% by weight of an acid selected from acrylic acid and methacrylic acid,
(2) about 1 to about 6 mole percent of hydrogen peroxide, based on the moles of said acid, and
(3) about 1 to about 20% by weight of a water-soluble formaldehyde sulfoxylate salt, and (b) Thereafter removing ungrafted polymeric acid from the filament by scouring.

In any case, product which is resistant to hole melting is thereafter obtained by reacting the grafted acid of the filament with metal ion to form the salt, preferably to form the calcium salt, as disclosed in the Tanner patent.

PRODUCT REQUIREMENTS

In order to obtain a high level of resistance to hole melting, the following requirements should be met:

(1) At least about 1600 equivalents of acid per million grams of polyamide should be grafted.
(2) The graft should extend substantially throughout the fiber cross-section, thus protecting the core as well as the surface from melting.
(3) The filament should be uniformly grafted along its length to obtain uniform properties such as dyeability.
(4) The filament should be essentially free from surface-deposited polyacrylic acid, which adversely affects filament friction and may give interfilament bonding.

PROCESS REQUIREMENTS

The steps of the process of the instant invention are important in obtaining a product having uniform properties and maximum resistance to hole melting with a minimum expenditure of reagents. In the discussion which follows, acrylic acid will be referred to as illustrative of either acrylic or methacrylic acid or mixtures containing both.

The step of impregnating the polyamide substrate filament is required in order to be sure that the unsaturated acid penetrates substantially into the center of the filament before grafting is initiated. Since the hydrogen peroxide is present in the acrylic acid solution, it too will diffuse, along with the acid, into the center of the filament. It is, of course, apparent that the filament must be impregnated with at least as much acrylic acid as will be required to be grafted in the final product, i.e. preferably 100 to 200% of that to be grafted.

If the formaldehyde sulfoxylate salt is to be added separately, any excess acrylic acid solution adhering to the fiber should be first removed as a normal precaution to avoid waste. However, this step has an additional purpose. It avoids the presence of excess acrylic acid on the surface of the fiber which would then polymerize when contacted with the reducing agent of the Redox initiator. The presence of substantial amounts of polyacrylic acid on the surface of the fiber is undesirable, since it represents a waste of material, makes trouble in staple processing, and in extreme cases may cause filaments to adhere to one another, thus leading to product non-uniformity. On the other hand, all the excess surface solution must not be removed, since it has been found that the presence of some excess solution on the surface of the fiber permits increased penetration of the acrylic acid and hence a larger amount grafted. It is hypothesized that the surface acrylic acid may serve as a reservoir to supply the grafting reaction within the filament itself. As mentioned previously, it is also necessary to allow enough time for the acid to diffuse into the center of the filament. The diffusion must be complete before the grafting action is initiated; obviously, once the acrylic acid becomes part of a polymer chain, it can no longer diffuse farther into the fiber. The soaking period depends on filament denier and acrylic acid concentration. In general, from 0.5 to 10 minutes is satisfactory. From 0.5 to 2 minutes is sufficient for textiles. Rapid diffusion is promoted by the fact that acrylic acid is a good swelling agent for polyamides.

Again in the case where the reducing agent in the Redox system is to be added separately, it must have a long enough induction time so that it can penetrate into the filament swollen with acrylic acid before graft polymerization begins. If a very active reducing agent is selected, polymerization will occur at the filament surface, and none of the reducing agent will get into the center of the filament; hence, little or no grafting will take place there. On the other hand, the induction time must be short enough so that a rapid throughput of material is obtained in a continuous process. Some adjustment of the induction time can be attained by changing the ratio of reducing agent to oxidizing agent or alternatively by changing the concentration of the reducing agent in the solvent in which it is applied. Generally, it will be desirable to use the maximum concentration of the reducing agent that gives an induction period in the desired range, since this will permit rapid polymerization and a minimum dilution of the surface film of acrylc acid adhering to the filament.

It is, of course, important to allow time for the grafting reaction to go to completion. Thus, loss of acrylic acid is avoided. However, due to the active Redox system used in the present process, the required time is not excessive. In general, it will be less than 20 minutes, often less than 10 minutes.

Removal of unattached, i.e. not grafted, polyacrylic acid is desirable in order to prevent high yarn friction and stuck filaments which would make subsequent processing difficult.

It is noteworthy that the instant process operates substantially at room temperature, so that expensive heating equipment is not required. It may sometimes be desirable to heat the acrylic acid solution if fibers of unusually large diameter are to be treated, thus increasing the rate of penetration of the acrylic acid. However, the fibers should not be contacted with the reducing agent at temperatures substantially higher than about 25° C., since the reducing agent will not have time to penetrate the fiber before the start of the grafting reaction.

METHOD OF APPLICATION

The acrylic acid containing dissolved hydrogen peroxide may be suitably applied by soaking the polyamide batchwise in an appropriate vessel as illustrated in Examples I and III. Soaking periods of up to 10 minutes or more may be used without disadvantage. However, in order to obtain higher throughput rate, it will usually be satisfactory to immerse the fabric and permit a soaking time of ½ to 1 minute. In general, for yarn of higher denier per filament, longer soaking times are required in order to get complete penetration. The acrylic acid solution can be applied by dipping, spraying, or padding.

The reducing agent is preferably applied in an aqueous solution. Concentrations of 3 to 7% are satisfactory. Higher concentrations decrease the induction period, which may not give the reducing agent time to penetrate all the way into the filament before the grafting starts. An advantage of high concentrations is that the acrylic acid on the surface of the filament is not diluted as much by the solvent for the reducing agent.

The reducing agent is preferably applied by spraying, desirably from both sides of the fabric or filament bundle. In general, application by means of rolls, padding or immersion in a bath is undesirable for a commercial operation, since this leads to contamination of the bath by surface acrylic acid carried over by the filaments. This contamination will result in polymerization within the bath containing the reducing agent.

In the second embodiment of the invention, the solution of acid plus oxidizing agent may be rapidly pre-mixed with the solution of reducing agent, for example in a jet which then sprays the mixed solution directly onto the polyamide filaments. This avoids the need for a two step application of hydrogen peroxide and formaldehyde sulfoxylate salt. This method of application requires that the exact amount of solution desired on the tow will be sprayed on, and that the induction period be long enough so that all components diffuse into the filament before polymerization starts.

When premixed solutions are employed, excess solution may be removed by squeeze rolls or wringers, or by blowing the excess from the fabric or filaments.

Ungrafted polyacrylic acid is conveniently removed by a scour in hot water, optionally in the presence of sodium carbonate. The sodium carbonate assists in removing the polyacrylic acid, then converts the grafted acrylic acid to the sodium salt, thus combining two steps into one. Alternatively, the fabric can be washed in distilled water followed by treatment with whatever metal ion is desired.

As indicated in the specification of the Tanner patent, the arcylic acid-grafted polyamide can be converted to any salt by treatment with the appropriate metal ion. However, for the purpose of the present invention, conversion to the calcium ion form is preferred, since this provides the optimum resistance to hole melting. It is usually desirable to convert the fiber to the sodium salt before converting to the calcium salt.

The following examples further illustrate the practice of the invention. Concentrations are given in weight percent unless otherwise noted. In each example the amount of acrylic acid used is greatly in excess of that theoretically required, e.g. a 0.3 to 0.6 gram fabric sample being soaked in 50–100 cc. of acrylic acid.

Example I

A fabric swatch woven from 2.5 denier per filament polyhexamethylene adipamide yarn is soaked for 5 to 10 minutes in 100% acrylic acid containing 5 mole percent (based on moles of acid) of hydrogen peroxide at room temperature. The acrylic acid contains 0.02% (on wt. of acid) methoxyhydroquinone inhibitor. After the soaking step, the fabric is removed from the acrylic acid, excess acid solution is drained off, and it is then stretched horizontally between clamps. The fabric is sprayed three times on each side with a 7% aqueous solution of sodium formaldehyde sulfoxylate (abbreviated: NaSF). After 20 minutes the fabric is removed, washed, dried and the weight gain is measured. A weight gain of 32.4%, based on the fabric weight, is observed (average of 4 experiments).

The procedure is repeated with other swatches of the same fabric, using various concentrations of hydrogen peroxide, acrylic acid and sodium formaldehyde sulfoxylate. The graft level obtained (weight gain) along with the processing date is indicated in Table 1.

The fabric is heated for 1 hour in 5% sodium carbonate solution at 60° C., thus converting the grafted acid into the sodium salt. Following this, the fabric is refluxed for one hour in an aqueous 3% calcium acetate solution, replacing the sodium ions with calcium ions. The decomposition point of the fabric is determined by using a heated metal block. It decomposes without melting above 285° C., which compares with a melting point of 249° C. for unmodified polyhexamethylene adipamide.

TABLE 1

| Sample | Acrylic Acid Concentration, Percent [1] | $H_2O_2$ Conc'n, Mol Percent [2] | NaSF, Percent [3] | Acrylic Acid Grafted, Percent [4] |
|---|---|---|---|---|
| A | 100 | 5 | 7 | 32.4 |
| B | 100 | 5 | 5 | 25.3 |
| C | 100 | 5 | 3 | 21.9 |
| D | 90 | 5 | 5 | 25.0 |
| E | 80 | 5 | 5 | 21.7 |
| F | 70 | 5 | 5 | 14.0 |
| G | 60 | 6 | 6 | 9.3 |
| H | 50 | 6 | 6 | 5.5 |

[1] Based on weight of solution.
[2] Based on moles of acrylic acid.
[3] Weight percent, based on weight of solution.
[4] Weight percent of acrylic acid, based on weight of polymer; value reported is the average of several duplicate tests.

Example II

This example shows the time required for polymerization to start ("induction period") when the specified concentrations of acrylic acid, sodium formaldehyde sulfoxylate (NaSF) and 66 nylon fabric are mixed at room temperature. The start of polymerization was observed visually. Acrylic acid of 100% concentration containing 0.02% (by wt.) of methoxyhydroquinone was used.

In the table, column A gives the mole percent $H_2O_2$ in the acrylic acid, column B gives the ml. of 100% acid used, column C gives the wt. percent whereas D gives the volume (ml.) of aqueous NaSF added. Column E gives the induction period. After grafting using the premixed solution in this manner, the filaments are further processed as in Example I.

TABLE 2

| A | B | C | D | E |
|---|---|---|---|---|
| 1 | 70 | 1.0 | 30 | 3.5 min. |
| 1 | 70 | 2.5 | 30 | 3 min. |
| 1 | 70 | 4.0 | 30 | 2 min. |
| 1 | 50 | 5.0 | 50 | 2 min. |
| 1 | 60 | 4.0 | 40 | 2 min. |
| 1 | 40 | 4.0 | 60 | 3 min. |
| 1 | 50 | 5.0 | 50 | 1.8 min. |
| 1 | 60 | 5.0 | 40 | 60 sec. |
| 5 | 25 | 10.0 | 25 | 44 sec. |
| 5 | 30 | 10.0 | 20 | 60 sec. |

Example III

A fabric is prepared from filaments formed of a polycarbonamide of bis(4 - amino-cyclohexyl)methane and dodecanedioic acid. In the filaments an average of 62% of units of the diamine are of the trans-trans isomer. The fabric is soaked in 55% acrylic acid containing 5 mole percent of hydrogen peroxide. The fabric is drained and stretched horizontally between clamps and is then sprayed with a 5% aqueous solution of sodium formaldehyde sulfoxylate; the spray is applied to both sides. The spraying was repeated 3 times. After 15 minutes the grafting reaction is complete; the fabric is then scoured to remove ungrafted polyacrylic acid. It is then converted to the calcium salt according to the procedure used in Example I. The modified fabric decomposed slowly without melting at temperatures above 285° C. In contrast, the unmodified polyaminde fabric melted at 244° C. The weight gain of the modified fabric is 19.7%, (average of two tests).

The diamine used for this polyamide occurs as trans-trans, cis-trans, and cis-cis isomers; the polymer contained some of each. Polyamides from this diamine having low trans-trans isomer content generally graft more readily than those of high trans-trans content, using the same treatment.

UNSATURATED ACIDS

As indicated in the specification of the aforementioned Tanner patent, any unsaturated acid may be used to produce the acid grafted polyamide; however, for the process of the instant invention, acrylic acid and methacrylic acids are preferred. These acids may be used without removing the polymerization inhibitors customarily present, thus avoiding the necessity for distilling acrylic acids and the hazards attendant thereto.

In order to attain the maximum weight gain of acrylic acid grafted, it is usually desirable to use the maximum concentration of acrylic acid which will not dissolve the polyamide. Thus for polyhexamethylene adipamide and when applying acrylic acid and reducing agent separately, concentrations of 80 to 100% acrylic acid are desirable as long as the soaking temperature does not exceed room temperature. For the polymer of Example III, concentrations should be limited to about 55%, since this polymer is more soluble in acrylic acid.

OXIDIZING AGENT

The preferred oxidizing agent for the process of this invention is hydrogen peroxide. Other oxidizing agents combined with various reducing agents do not give an optimum induction time.

REDUCING AGENTS

The reducing agent employed in the Redox system of the instant invention is a water-soluble formaldehyde sulfoxylate salt, having the formula $M(SO_2-CH_2OH)$, wherein M is preferably an alkali metal, e.g. sodium or potassium, or ammonium ion. These agents provide a very desirable combination of reasonable induction period, rapid polymerization of the acrylic acid, and avoid damage or discoloration of the polyamide fiber. Other exceedingly active reducing agents produce an undesirable coloration of the polyamide. For example, ferrous iron gives a brown discoloration whereas thiourea gives a precipitate of sulfur which is difficult or impossible to remove from the fabric. Still other reducing agents are too slow to be of real utility for a continuous process.

The need for a Redox system that provides proper induction time has been described. Proper Redox pairs cannot be selected based on their effect on the polymerization of acrylic acid alone, since the presence of the polyamide has a profound effect on the observed induction time.

POLYAMIDES USEFUL

Suitable polyamides for use in accordance with the invention of these synthetic linear polyamides which are prepared from polymerizable monoamino monocarboxylic acids or their amide-forming derivatives, or from suitable diamine and suitable dicarboxylic acids or from amide-forming derivatives of these compounds. The preferred polyamides are those wherein the intracarbonamide linkages are other than exclusively aromatic, i.e., there is at least 1 aliphatic —HCR— group in each repeating unit of the polymer molecule. The —R— group may be hydrogen, halogen, monovalent organic radical, alkylene or the like. Typical of such polyamides are those formed from an aliphatic diamine and an aliphatic acid containing the repeating unit

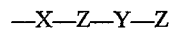

wherein —X— and —Y— represent divalent aliphatic or cycloaliphatic groups and —Z— represents the

linkage. Polyhexamethyleneadipamide and caproamide (i.e., "66" and "6" nylons) are typical. Other suitable polyamides are those having the repeating structure —A—Z—X—Z wherein —A— is a divalent aromatic radical and —X— and —Z— are as previously defined.

Polyhexamethylene terephthalamide is illustrative of such polymers. Additionally polyamides having repeating units such as —A—Z—B—Z— and —X—Z—B—Z— wherein —B— is divalent alkaryl (such as xylylene) may be used. Another class of suitable polyamides containing other than aromatic intracarbonamide repeating units are those prepared from piperazine, such as those from piperazine and adipic acid, piperazine and terephthalic acid, and the like. Copolyamides, condensation copolymers wherein the amide linkage is the predominant linkage and polyamide mixtures are also useful.

SUBSTRATE SHAPE

The polyamide substrate to be treated in accordance with the process of this invention must have at least one small dimension in order for the acrylic acid to penetrate rapidly. Preferably, the substrate is in the form of filaments. Filaments of from 1 d.p.f. to 100 d.p.f. are operable. The range of from 1½ to 15 d.p.f. is preferred. The process may be applied to filaments in any form such as continuous filaments, monofil, multifil, flock, staple, or tow. Fabrics may be treated in any form such as felted, knitted, or woven fabrics. The invention is especially useful for fabrics, such as carpets, rugs, drapery and upholstery, since these are often exposed to the risk of hole melting, e.g., from cigarettes.

What is claimed is:

1. Grafting process for a polycarbonamide filament containing recurring amide linkages as an integral part of the polymer chain, said process comprising the steps of:
    (a) impregnating said filament throughout by treatment for a period of about 0.5 to about 10 minutes with a mixture consisting essentially of hydrogen peroxide and an acid selected from acrylic acid and methacrylic acid to provide at least about 1600 equivalents of said acid per million grams of polycarbonamide, said mixture containing from about 3 to about 6 mole percent of hydrogen peroxide based on the moles of said acid,
    (b) contacting the said acid-treated filament with a solution consisting essentially of from about 3 to about 7% by weight of a water-soluble formaldehyde sulfoxylate salt and from about 97 to about 93% water to initiate the grafting reaction within about 1.5 to about 4 minutes, and
    (c) thereafter removing ungrafted polymeric acid from the filament by an aqueous scour.

2. Grafting process according to claim 1 wherein the treatment period in step (a) is about 0.5 to about 2 minutes.

3. Grafting process according to claim 1 wherein the treatment of step (a) is effected at room temperature.

4. Grafting process for a polycarbonamide filament containing recurring amide linkages as an integral part of the polymer chain, said process comprising the steps of:
    (a) impregnating and grafting said filament throughout by treatment with an aqueous mixture consisting essentially of
        (1) about 40 to about 70% by weight of an acid selected from acrylic acid and methacrylic acid,
        (2) about 1 to about 6 mole percent of hydrogen peroxide, based on the moles of said acid, and
        (3) about 1 to about 20% by weight of a water-soluble formaldehyde sulfoxylate salt, and
        (4) sufficient water to total 100%, and
    (b) thereafter removing ungrafted polymeric acid from the filament by scouring.

5. Grafting process according to claim 4 wherein the treatment of step (a) is effected at room temperature.

References Cited

UNITED STATES PATENTS

| | | |
|---|---|---|
| 3,083,118 | 3/1963 | Bridgeford. |
| 3,099,631 | 6/1963 | Tanner. |
| 3,297,471 | 1/1967 | Traumann. |
| 3,297,786 | 1/1967 | Horowitz. |

NORMAN G. TORCHIN, *Primary Examiner.*

J. CANNON, *Assistant Examiner.*